United States Patent
Oh (10) Patent No.: US 9,573,470 B2
(45) Date of Patent: Feb. 21, 2017

(54) AUDIO-VIDEO DEVICE FOR VEHICLE

(71) Applicants: Hyundai Motor Company, Seoul (KR); Kia Motors Corporation, Seoul (KR)

(72) Inventor: Se Min Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/828,665

(22) Filed: Aug. 18, 2015

(65) Prior Publication Data

US 2016/0137062 A1    May 19, 2016

(30) Foreign Application Priority Data

Nov. 18, 2014    (KR) .................. 10-2014-0160971

(51) Int. Cl.
*B60K 37/02* (2006.01)
*H01Q 1/22* (2006.01)
*H01Q 21/28* (2006.01)

(52) U.S. Cl.
CPC .......... *B60K 37/02* (2013.01); *H01Q 1/2291* (2013.01); *H01Q 21/28* (2013.01); *B60K 2350/106* (2013.01); *B60K 2350/1056* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,009,363 A | * | 12/1999 | Beckert | B60R 11/02 307/10.7 |
| 6,175,789 B1 | * | 1/2001 | Beckert | B60R 11/02 248/27.1 |
| 6,202,008 B1 | * | 3/2001 | Beckert | B60R 11/02 248/27.1 |
| 6,339,696 B1 | * | 1/2002 | Chan | H04B 1/16 386/E5.002 |
| 6,409,242 B1 | * | 6/2002 | Chang | B60R 11/0235 296/37.7 |
| 7,099,152 B2 | * | 8/2006 | Gasbarro | G06F 1/1632 312/223.3 |
| 7,301,757 B2 | * | 11/2007 | Lee | A45C 13/02 224/275 |
| 7,529,080 B2 | * | 5/2009 | Koutari | G01C 21/265 312/7.2 |

(Continued)

FOREIGN PATENT DOCUMENTS

| | | |
|---|---|---|
| JP | 2006-166010 A | 6/2006 |
| JP | 2012-235224 A | 11/2012 |

(Continued)

OTHER PUBLICATIONS

Notice of Allowance from Korean Intellectual Property Office for Korean Application No. 10-2014-0160971, issued on Mar. 2, 2016, English abstract, 7 pages.

*Primary Examiner* — Lisa Lea Edmonds
(74) *Attorney, Agent, or Firm* — Mintz Levin Cohn Ferris Glovsky and Popeo, P.C.; Peter F. Corless (57) ABSTRACT

An audio-video (AV) device for a vehicle includes a display panel including a display unit and a pattern unit arranged on edges of the display unit; and a display board disposed on a rear face of the display panel. The display board includes at least one wireless antenna located outside of the display unit, an antenna module, and a connector.

16 Claims, 6 Drawing Sheets

(56) References Cited

U.S. PATENT DOCUMENTS

| | | | | |
|---|---|---|---|---|
| 7,567,431 B2* | 7/2009 | Brooks, Jr. | ...... | G07B 17/00193 235/462.43 |
| 7,660,103 B2* | 2/2010 | Ozaki | ......... | G01C 21/265 248/917 |
| 7,679,578 B2* | 3/2010 | Schedivy | ......... | B60N 2/4876 296/37.15 |
| 7,706,142 B2* | 4/2010 | Noisternig | ......... | G11B 17/051 361/679.47 |
| 7,885,057 B2* | 2/2011 | Itoh | ......... | B60R 11/02 361/679.01 |
| 7,933,121 B2* | 4/2011 | Schedivy | ......... | B60R 11/0211 150/165 |
| 8,154,858 B2* | 4/2012 | Itoh | ......... | B60R 11/02 248/137 |
| 8,508,075 B2* | 8/2013 | Tsuji | ......... | B60R 11/0235 307/64 |
| 8,531,829 B2* | 9/2013 | Oberpriller | ......... | G06F 1/1656 361/679.41 |
| 8,698,344 B2* | 4/2014 | Tokue | ......... | B60R 11/0211 307/9.1 |
| 8,896,550 B2* | 11/2014 | Nakamura | ......... | G01C 21/26 178/18.06 |
| 9,007,447 B2* | 4/2015 | Wohrle | ......... | B60R 11/0235 348/61 |
| 9,008,856 B2* | 4/2015 | Ricci | ......... | G06F 9/54 455/404.1 |
| 2006/0250531 A1* | 11/2006 | Hsu | ......... | B60R 11/0235 348/844 |
| 2007/0055396 A1* | 3/2007 | Hedges | ......... | G11B 33/025 700/94 |
| 2007/0063826 A1* | 3/2007 | Baig | ......... | B60K 35/00 340/438 |
| 2008/0189748 A1* | 8/2008 | Bleacher | ......... | H04N 7/17318 725/76 |
| 2009/0121849 A1* | 5/2009 | Whittaker | ......... | G07C 5/0866 340/425.5 |
| 2010/0145611 A1 | 6/2010 | Tokue et al. | | |
| 2010/0202107 A1* | 8/2010 | Noisternig | ......... | G11B 17/051 361/679.46 |
| 2010/0254077 A1 | 10/2010 | Yoshikawa | | |
| 2011/0164388 A1* | 7/2011 | Ozaki | ......... | B60R 11/0235 361/725 |

FOREIGN PATENT DOCUMENTS

| | | |
|---|---|---|
| KR | 10-2007-0071742 A | 7/2007 |
| KR | 10-2003-0033337 | 8/2008 |
| KR | 20-2009-0004991 | 5/2009 |

* cited by examiner

AUDIO-VIDEO DEVICE FOR VEHICLE

CROSS-REFERENCE TO RELATED APPLICATION

This application claims priority to and the benefit of, under 35 U.S.C. §119(a), a Korean patent application filed on Nov. 18, 2014 in the Korean Intellectual Property Office and assigned Serial No. 10-2014-0160971, the entire disclosure of which is incorporated herein by reference.

TECHNICAL FIELD

The present disclosure relates generally to audio-video devices for vehicle, and more particularly, to an audio-video device that incorporates a wireless communication module.

BACKGROUND

Vehicles are commonly equipped with various comfort systems that offer convenience to the driver. Recent development of electronic devices and communication technologies include audio-video (AV) systems for presenting results from a digital versatile disc (DVD) system and navigation systems and displaying images of what is ahead or behind of the vehicle on its image display, such as a liquid crystal display (LCD)., Such systems are often installed on the front cover of the vehicle. In this regard, AV systems may provide information involving a traveling route from a starting place to a destination, a current location of the vehicle, or the like. Moreover, AV systems may play music or video, receive and display terrestrial or satellite broadcasts, and provide information for user convenience, such as conditions of the vehicle, weather, news, etc.

As wireless communication technologies evolve, AV systems tend to work in cooperation with other devices. For example, a wireless communication unit, such as a Wi-Fi unit or a Bluetooth unit, may be included in an AV system. Such wireless communication unit typically includes a wireless antenna and a wireless module. In general, the wireless antenna and wireless module are separately manufactured and then connected to the AV system via a connector.

AV systems, as well as other convenience-providing devices, may be integrated and mounted on the front cover of the vehicle, and as such, are required to be compact in size. However, separately manufacturing the wireless antenna and wireless module of a wireless communication unit can lead to difficulty in designing the layout of the vehicle due to the volume. Furthermore, it may also raise the unit cost of manufacturing.

SUMMARY

The present disclosure provides an audio-video (AV) device for a vehicle, in which a wireless antenna and a wireless communication module are integrated together on a display board.

In accordance with embodiments of the present disclosure, an AV device includes: a display panel including a display unit and a pattern unit arranged on edges of the display unit; and a display board disposed on a rear face of the display panel. The display board includes at least one wireless antenna located outside of the display unit, an antenna module, and a connector.

The display board may further include a projection part protruding to a side of the display panel, and the at least one wireless antenna may be disposed on a front of the projection part.

The pattern unit may include a wire unit having a plurality of wires arranged along outer edges of the display unit, and a connection unit located on a side of the display unit connecting the plurality of wires to the display board, the display board may further include a projection part protruding to a side of the display unit, and the at least one wireless antenna may be disposed on a front of the projection part.

The at least one wireless antenna may be fixed on a front face of the display board, the antenna module and the connector may be fixed on a rear face of the display board, and the display board may further include a first antenna wire unit electrically connecting the wireless antenna to the antenna module and a second antenna wire unit electrically connecting the antenna module to the connector.

The connector may be connected to another connector to be electrically connected to a main board contained inside of a chassis.

The at least one wireless antenna may include at least one of a Wi-Fi antenna and a Bluetooth antenna, or the at least one wireless antenna may include a Wi-Fi antenna and a Bluetooth antenna.

The Wi-Fi antenna and the Bluetooth antenna may be disposed at respective locations greater than 15 cm away from each other.

The antenna module may be configured to process signals input from the Wi-Fi antenna and the Bluetooth antenna together.

The at least one wireless antenna may include a first wireless antenna disposed at an end of the projection part and a second wireless antenna disposed at another end of the projection part, with respect to a center of the display unit, and the display board may further include a first antenna wire unit electrically connecting the wireless antenna to the antenna module and a second antenna wire unit electrically connecting the antenna module to the connector.

The projection part may be formed to be longer than a length of the side of the display panel and protrude outwardly from both sides of the display panel.

The projection part may include a first projection part protruding to a side from the display panel and a second projection part protruding to another side from the display panel.

The first and second projection parts protrude at opposite locations.

The at least one wireless antenna may include a first wireless antenna disposed at an end of the first projection part and a second wireless antenna disposed at an end of the second projection part diagonally opposite to the end of the first projection part.

The display panel may be rectangular in shape, and the first and second projection parts may protrude from edges of a "¬"-like shape of the display panel.

The at least one wireless antenna may include first and second wireless antennas disposed at locations spaced apart from an angular point of the "¬"-like shape of the display panel.

Other aspects, advantages, and salient features of the disclosure will become apparent to those skilled in the art from the following detailed description, which, taken in conjunction with the annexed drawings, discloses exemplary embodiments of the disclosure

BRIEF DESCRIPTION OF THE DRAWINGS

The above and other features and advantages of the present disclosure will become more apparent by describing in detail embodiments thereof with reference to the attached drawings in which.

Throughout the drawings, like reference numerals will be understood to refer to like parts, components, and structures.

DETAILED DESCRIPTION OF THE EMBODIMENTS

The present disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Like reference numerals in the drawings denote like elements, and thus their description will be omitted. In the description of the present disclosure, if it is determined that a detailed description of commonly-used technologies or structures related to the embodiments of the present disclosure may unnecessarily obscure the subject matter of the disclosure, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Additionally, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. Reference will now be made in detail to the disclosed embodiments, examples of which are illustrated in the accompanying drawings, wherein like reference numerals refer to the like elements throughout.

In the following description, an AV device installed in an automobile is taken as an example.

Figure 1:
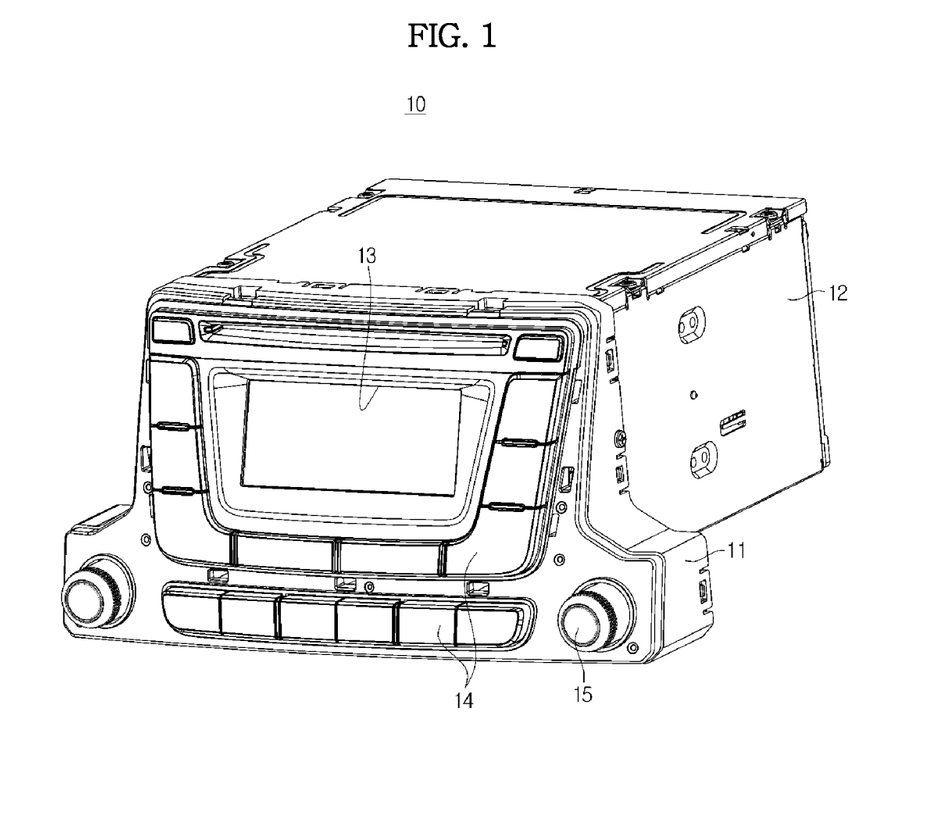
FIG. 1 is a perspective view of an audio-video (AV) device for vehicle.

FIG. 1 is a perspective view of an AV device 10 for vehicle, viewed from the front. As shown in FIG. 1, the AV device 10 which may be mounted on the center fascia of the vehicle includes a front cover 11 and a chassis 12.

The front cover 11 may have an opening for a display unit 13 with a display of a display panel exposed to the outside. Further, on the front cover 11, buttons 14 to execute various audio or video menu items, and control knobs 15 to control various functions, e.g., of an audio player and/or an air conditioner, may be arranged.

The chassis 12 is a case that protects various boards and panels of the AV device 10 from the outside environment. The chassis 12 may be manufactured from a shockproof material. The chassis 12 may include a front chassis coupled with the front cover 11, a sides and rear chassis, and a cover chassis.

Figure 2:
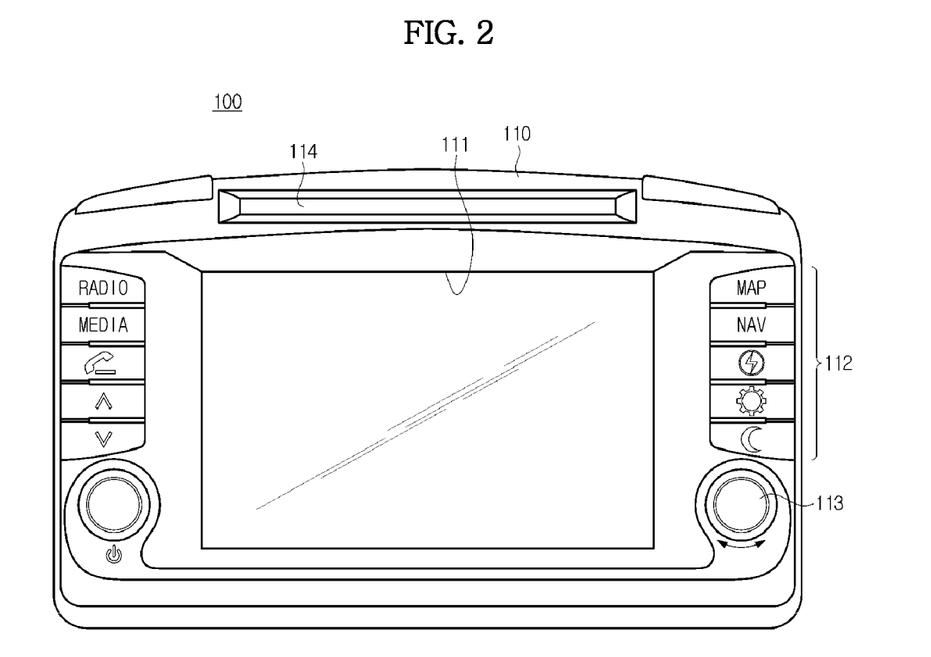
FIG. 2 is a front view of an AV device, according to embodiments of the present disclosure.

FIG. 2 is a front view of an AV device 100, according to embodiments of the present disclosure. As shown in FIG. 2, the AV device 100 may be an audio-video-navigation (AVN) device that further includes navigation functionality. Accordingly, a display unit 111 of the AV device 100 may be larger as compared to FIG. 1. The display unit 111 may also be touch-sensitive and display maps and other navigational menus.

The AV device 100 may include a front cover 110 and a chassis (not shown but analogous to the chassis 12 of FIG. 1). On the front cover, the display unit 111, buttons 112, control knobs 113, and a disc slot 114 may be formed.

The buttons 112 may be arranged outside of the display unit 111 to select or execute radio, audio, phone, move, map, navigation, settings, power save mode menus, etc.

The control knobs 113 may be placed on either lower sides of the display unit 111. The control knobs 113 may jut out for giving better grip. For example, the driver or the passenger may control volume and/or temperature of an air conditioner by turning the control knob 13 or select on/off of the AV device 100 and the air conditioner by pressing the control knob 13.

A display panel 120 and a display board 130 in accordance with embodiments of the present disclosure will now be described with reference to FIGS. 3 and 4.

The AV device 100 may include the display panel 120 placed on the front face of the AV device 100 and the display board 130 placed in the back of the display panel 120. The display panel 120 and the display board 130 may be placed ahead of a chassis that contains a main board or the like. More specifically, they may be placed ahead of the front chassis.

Figure 3:
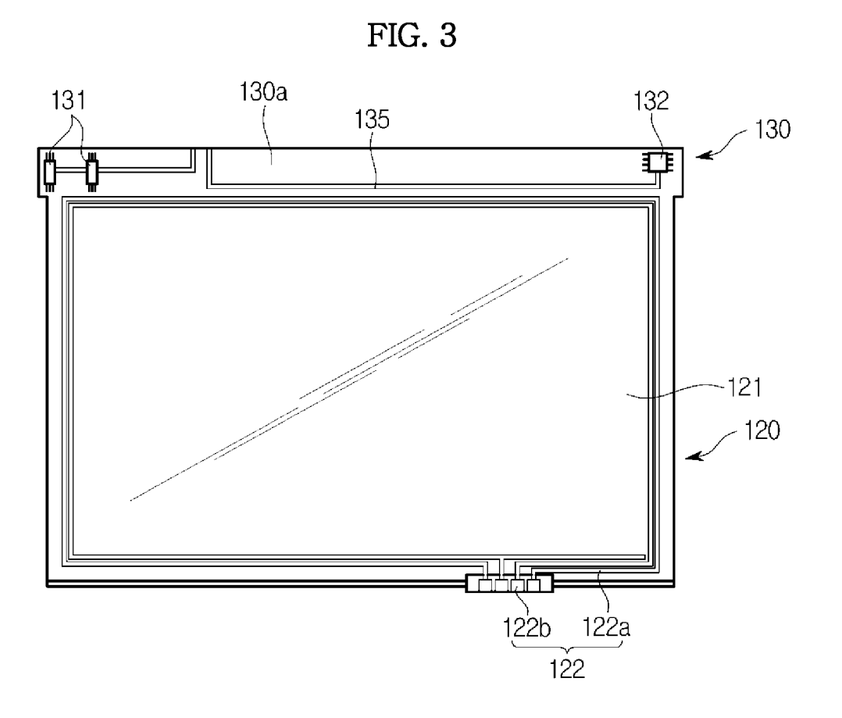
FIG. 3 is a plane view of a display panel of an AV device, according to embodiments of the present disclosure.
Figure 4:
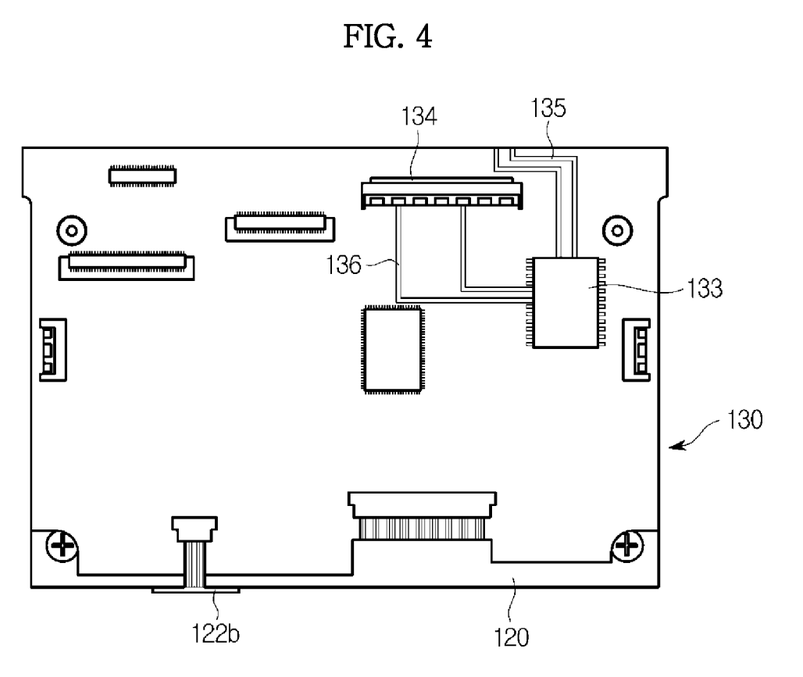
FIG. 4 is a plane view of a display board, according to embodiments of the present disclosure.

Referring to FIG. 3, the display panel 120 may include a display unit 121 for displaying images and a pattern unit 122 formed on edges of the display unit 121. For example, the display unit 121 may be a liquid crystal display (LCD) unit. The display unit 121 may be formed in a rectangular shape.

The pattern unit 122 may include a plurality of wires 122a electrically coupled with the display unit 121, and a connection unit 122b that connects the wires 122a to the display board 130. The wires 122a may be arranged along edges of the display unit 121 and coupled with the connection unit 122b. For example, the wires 122a may be connected to the display unit 121 at either side edges of the display unit 121, and extend along the sides and lower part of the display unit 121 to be connected to the connection unit 122b located in the lower part of the display unit 121.

The display board 130 may be placed on the rear face of the display unit 121. The display board 130 and the display panel 120 may be formed in one piece, or may be separately manufactured and then combined into one piece. For example, the display panel 120 and the display board 130 may be fastened through mechanical coupling or adhesion. The display board 130 may correspond to a printed circuit board (PCB) including various devices and circuit patterns that may exchange electrical signals with the display unit 121. The display board 130 may include wireless antennas 131, 132 placed outside of the display unit 121, and an antenna module 133 and connector 134, which are placed in the back of the display panel 120. The wireless antennas 131, 132 may include a Wi-Fi antenna 131, a Bluetooth antenna 132, a Wibro antenna, a global positioning system (GPS) antenna, or other multiple wireless antennas. The wireless antennas 131, 132 may transmit or receive audio and/or video signals by wirelessly communicating with a mobile device of a person in the vehicle, an electronic device of the vehicle, or an electronic device external to the vehicle.

The wireless antennas 131, 132 may be chip antennas. The chip antennas refer to what has antennas directly mounted on the surface of a PCB. The wireless antennas 131, 132 may be placed on the display board 130 located ahead of the front chassis and thus prevent the chassis from blocking signals. If the wireless antennas 131, 132 are located on e.g., a main board contained inside of the chassis, reception rate may drop because the chassis blocks signals. The wireless antennas 131, 132 may be located on the front face of the display board 130, while the antenna module 133 and connector 134 may be located on the rear face of the display board 130. The front face refers to where the display unit 121 is placed. With the wireless antennas 131, 132 placed on the front, signal blocking of the chassis may be prevented. Otherwise, if the wireless antennas 131, 132 are placed on the rear face of the display board 130, the display board 130 may block signals and thus the reception rate may drop.

The display board 130 may include a projection part 130a that protrudes to a side of the display panel 120. The projection part 130a illustrated in FIG. 3 protrudes upward from the display panel 120. The wireless antennas 131, 132 may be installed on the front face of the projection part 130a. The wireless antennas 131, 132 are arranged outside of the display panel 120, thereby preventing the display panel 120 from interfering with or blocking signals.

In embodiments of the present disclosure, the wireless antennas 131, 132 may include the Wi-Fi antenna 131 and the Bluetooth antenna 132. However, they are not limited thereto, and may select and include one or more of the Wi-Fi antenna, the Bluetooth antenna, the Wibro antenna, the GPS antenna, etc.

Embodiments where the Wi-Fi antenna 131 and the Bluetooth antenna 132 are included will now be described.

Since the Wi-Fi antenna 131 and the Bluetooth antenna 132 receive different wireless signals, they may interfere with each other. Accordingly, placing them far apart may improve their reception rate. An experiment shows that interference-free reception is possible when the WiFi-antenna and the Bluetooth antenna are placed more than about 15 cm apart from each other. Therefore, it is preferable for the WiFi-antenna 131 and the Bluetooth antenna 132 to be placed more than about 15 cm apart from each other. An upper limit of the distance between the two antennas 131 and 132 depends on the size restriction of the display board 130. Since the AV device 100 is commonly mounted on the center fascia of the vehicle, the size of the display board 130 is restricted by the surrounding structures. In other words, the upper limit of the distance between the two antennas 131, 132 may be taken to the full extent under such restrictions.

The display panel 120 and the display board 130 may be rectangular in shape with two opposite sides longer than the other two opposite sides, and in this case, the projection part 130a of the display board 130 may protrude on the longer side. The Wi-Fi antenna 131 and the Bluetooth antenna 132 may be placed apart from each other on either ends of the projection part 130a. Specifically, with respect to the center of the display unit 121, the Wi-Fi antenna 131 may be located on one end of the projection part 130a and the Bluetooth antenna 132 may be located on the other end of the projection part 130a.

The length of the projection part 130a may be determined to be longer than the side length of the display panel 120. Therefore, the projection part 130a may be formed to not only protrude upward from the display panel 20 but also protrude to both sides. Placing the Wi-Fi antenna 131 and the Bluetooth antenna 132 on both ends of the projection part 130a to be as far from each other as possible may increase the reception rate. The projection part 130a may protrude at any edge different from an edge where the connection unit 122b is located. In FIG. 3, the connection unit 122b is placed on the bottom part of the display panel 120 and the projection part 130a protrudes in the top part of the display panel 120. With the wireless antennas 131, 132 located far apart from the connection unit 122b, interference with each other may be minimized.

The antenna module 133 and the connector 134 may be fixed onto the rear face of the display board 130. The wireless antennas 131, 132 may be coupled with the antenna module 133 via a first antenna wire 122a. The first antenna wire 122a may be connected to the wireless antenna 131, 132 at one end, extend along the projection part 130a, and be connected to the antenna module 133 at the other end.

Since the wireless antennas 131, 132 are located on the front face of the display board 130 while the antenna module 133 is located on the rear face of the display board 130, the first antenna wire 122a may be arranged to wind around the corners of the display board 130. In other words, the first antenna wire 122a may extend along the top corners of the display board 130 down to the bottom part of the display board 130. Alternatively, the first antenna wire 122a may extend through the display board 130 to its rear face.

The antenna module 133 may be connected to the connector 134 via a second antenna wire 122a, and the connector 134 may be connected to the main board through another connector (not shown). For example, an end of the other connector is connected to the connector 134 and the other end may be connected to the main board (not shown) contained within the chassis by being inserted to the inside of the chassis through a via of the front chassis. The antenna module 133 in accordance with embodiments of the present disclosure may process signals input from the wireless antennas 131, 132 and sent the results to the main board. With multiple wireless antennas 131, 132, the antenna module 133 is configured to process all the signals from the multiple wireless antennas 131, 132. For example, the antenna module 133 may process signals input from the Wi-Fi antenna 131 and the Bluetooth antenna 132 together.

Figure 5:
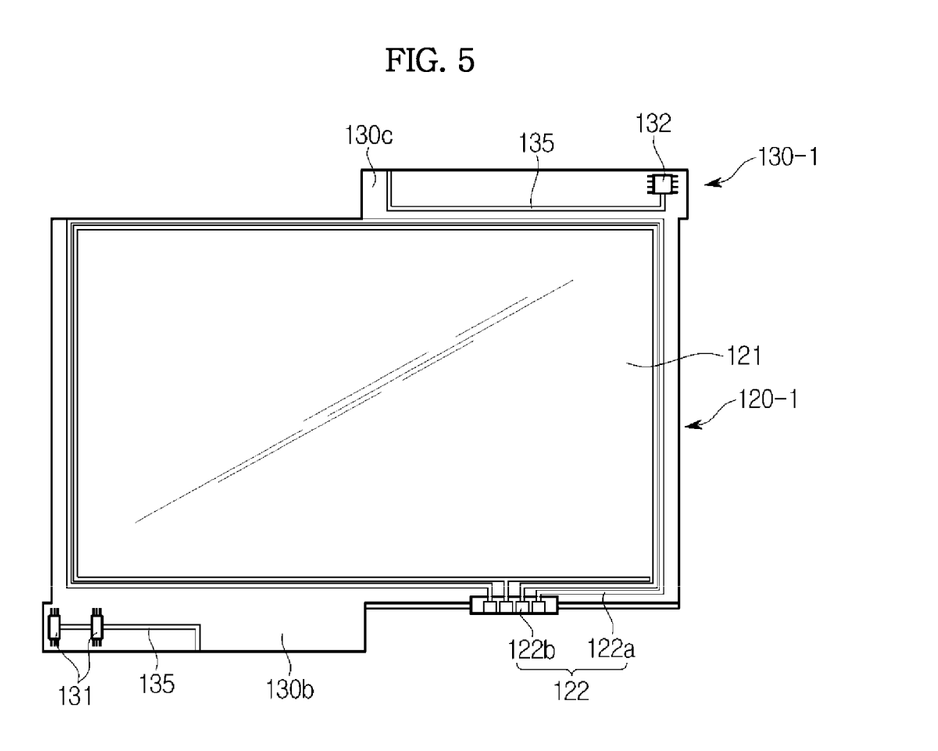
FIG. 5 is a plane view of a display panel of an AV device, according to embodiments of the present disclosure.

FIG. 5 is a plane view of a display panel 120-1 of the AV device 100, according to embodiments of the present disclosure.

In this case, a display board 130-1 includes a first projection part 130b that protrudes downward from the display panel 120-1 and a second projection part 130c that protrudes upward. The first wireless antenna 131 is formed at an end of the first projection part 130b, and the second wireless antenna 132 may be formed on the second projection part 130c at a location diagonally opposite to the end of the first projection part 130b.

By placing the first and second antennas 131 and 132 on the first and second projection parts 130b and 130c, respectively, which face each other with the display unit 121 in between, the distance between the two wireless antennas 131, 132 may be longer. In addition, with such arrangement, interference between the two wireless antennas 131, 132 may be minimized.

For example, in FIG. 5, it is illustrated that the Wi-Fi antenna 131 is arranged at the left end of the first projection part 130b that protrudes downward from the display board 130 and the Bluetooth antenna 132 is arranged at the right end of the second projection part 130c that protrudes upward from the display board 130.

Figure 6:
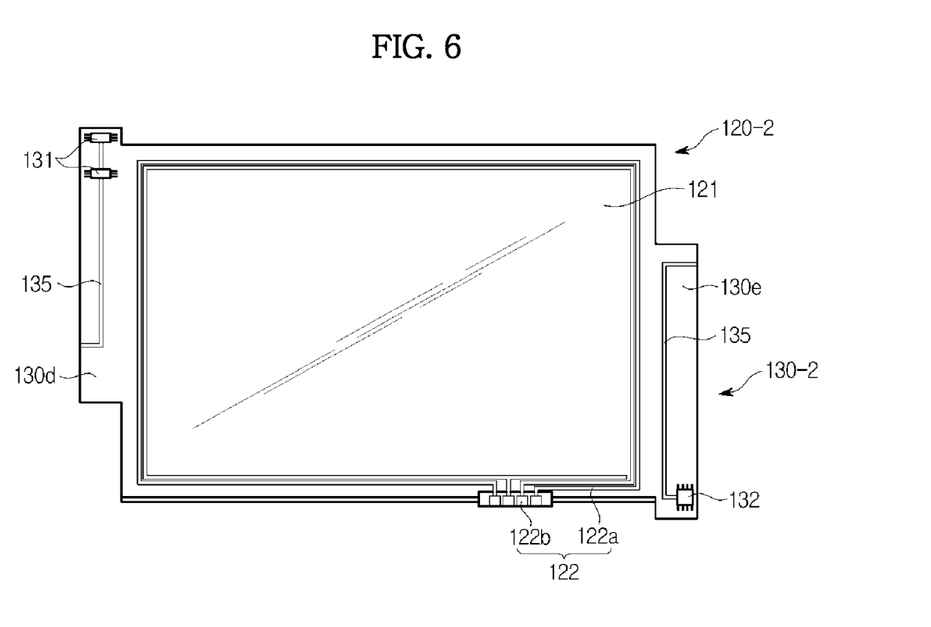
FIG. 6 is a plane view of a display panel of an AV device, according to embodiments of the present disclosure.

FIG. 6 is a plane view of a display panel 120-2 of the AV device 100, according to embodiments of the present disclosure.

In this case, a display board 130-2 includes a first projection part 130d that protrudes to the left from the display panel 120-2 and a second projection part 130e that protrudes to the right. The first wireless antenna 131 is arranged at an end of the first projection part 130d, and the second wireless antenna 132 may be arranged on the second projection part 130e at a location diagonally opposite to the end of the first projection part 130d.

Although not shown, the display board 130 in accordance with an embodiment of the present disclosure may include first and second projection parts that protrude from respective edges of a "¬"-like shape of the display panel 120. In this case, the wireless antennas 131, 132 may have the first wireless antenna 131 placed on the first projection part at a location away from the angular point of the "¬"-like shape of the display panel 120 and have the second wireless antenna 132 placed on the second projection part at a location away from the angular point of the "¬"-like shape.

Unlike the aforementioned embodiments, the projection part 130 may be implemented in various combinations and one or more wireless antennas may be arranged on each projection part 130. For example, projection parts 130 may protrude from four edges of the display panel 120, and different wireless antennas may be arranged on the respective projection parts.

In accordance with embodiments of the present disclosure, an AV device may have a wireless antenna and a wireless communication module integrated together on a display board. Such implementation of the wireless antenna and wireless communication module is compact as compared to an occasion where wireless communication units are separately manufactured. It may also reduce the unit cost of manufacturing and simplify the manufacturing process.

Several embodiments have been described but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. An audio-video (AV) device for a vehicle comprising:
a display panel including a display unit and a pattern unit arranged on edges of the display unit; and
a display board disposed on a rear face of the display panel,
wherein the display board includes at least one wireless antenna located outside of the display unit, an antenna module, and a connector.

2. The AV device of claim 1, wherein:
the display board further includes a projection part protruding to a side of the display panel, and
the at least one wireless antenna is disposed on a front of the projection part.

3. The AV device of claim 2, wherein:
the at least one wireless antenna includes a first wireless antenna disposed at an end of the projection part and a second wireless antenna disposed at another end of the projection part, with respect to a center of the display unit, and
the display board further includes a first antenna wire unit electrically connecting the at least one wireless antenna to the antenna module and a second antenna wire unit electrically connecting the antenna module to the connector.

4. The AV device of claim 2, wherein the projection part is formed to be longer than a length of the side of the display panel and protrude outwardly from both sides of the display panel.

5. The AV device of claim 2, wherein the projection part includes a first projection part protruding to one side from the display panel and a second projection part protruding to another side from the display panel.

6. The AV device of claim 5, wherein the first and second projection parts protrude at opposite locations.

7. The AV device of claim 6, wherein the at least one wireless antenna includes a first wireless antenna disposed at an end of the first projection part and a second wireless antenna disposed at an end of the second projection part diagonally opposite to the end of the first projection part.

8. The AV device of claim 5, wherein:
the display panel is rectangular in shape, and
the first and second projection parts protrude from edges of a "¬"-like shape of the display panel.

9. The AV device of claim 8, wherein the at least one wireless antenna includes first and second wireless antennas disposed at locations spaced apart from an angular point of the "¬"-like shape of the display panel.

10. The AV device of claim 1, wherein:
the pattern unit includes a wire unit having a plurality of wires arranged along outer edges of the display unit and a connection unit located on a side of the display unit connecting the plurality of wires to the display board,
the display board further includes a projection part protruding to a side of the display unit, and
the at least one wireless antenna is disposed on a front of the projection part.

11. The AV device of claim 1, wherein:
the at least one wireless antenna is fixed on a front face of the display board,
the antenna module and the connector are fixed on a rear face of the display board, and
the display board further includes a first antenna wire unit electrically connecting the wireless antenna to the antenna module and a second antenna wire unit electrically connecting the antenna module to the connector.

12. The AV device of claim 11, wherein the connector is connected to another connector to be electrically connected to a main board contained inside of a chassis.

13. The AV device of claim 1, wherein the at least one wireless antenna includes at least one of a Wi-Fi antenna and a Bluetooth antenna.

14. The AV device of claim 1, wherein the at least one wireless antenna includes a Wi-Fi antenna and a Bluetooth antenna.

15. The AV device of claim 14, wherein the antenna module is configured to process signals input from the Wi-Fi antenna and the Bluetooth antenna together.

16. The AV device of claim 7, wherein the Wi-Fi antenna and the Bluetooth antenna are disposed at respective locations greater than 15 cm away from each other.

* * * * *